June 5, 1928.
C. G. BATHÉ
1,672,798
DOG RACING DEVICE
Filed June 4, 1926
2 Sheets-Sheet 2
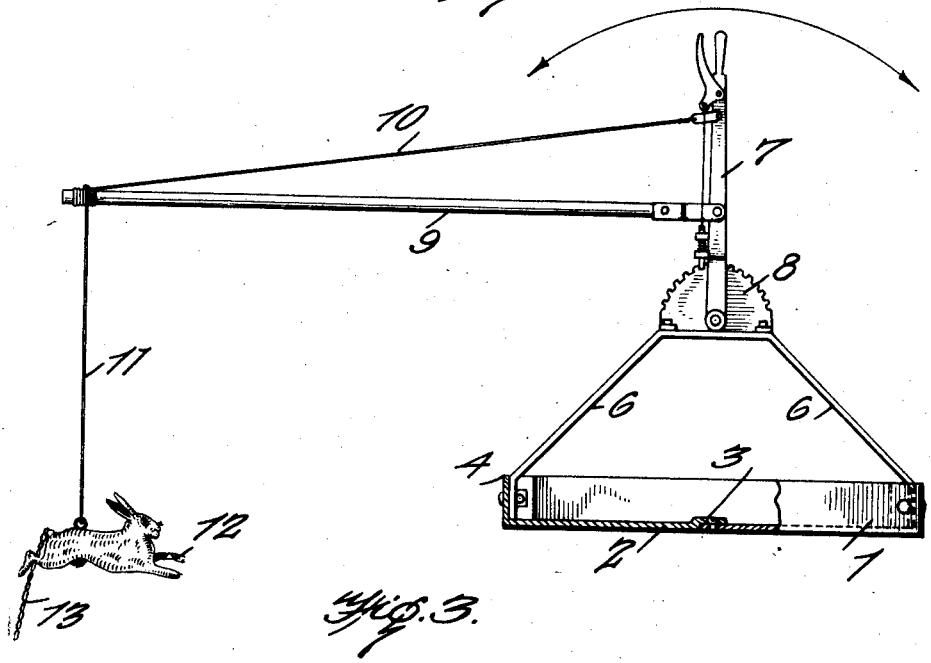
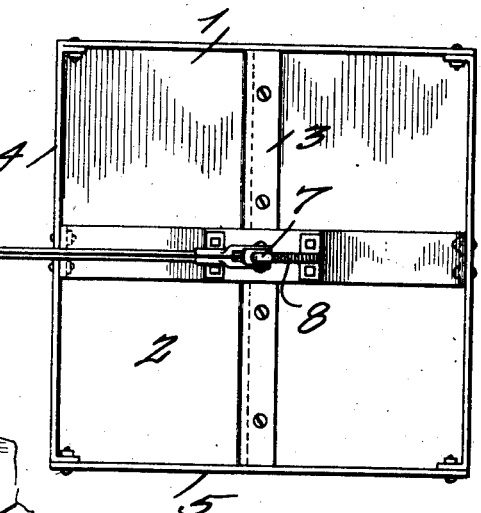
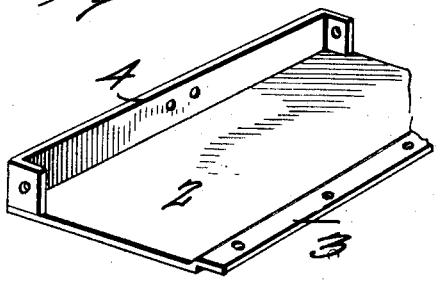
C. G. BATHÉ,
INVENTOR
BY Victor J. Evans
ATTORNEY Patented June 5, 1928.

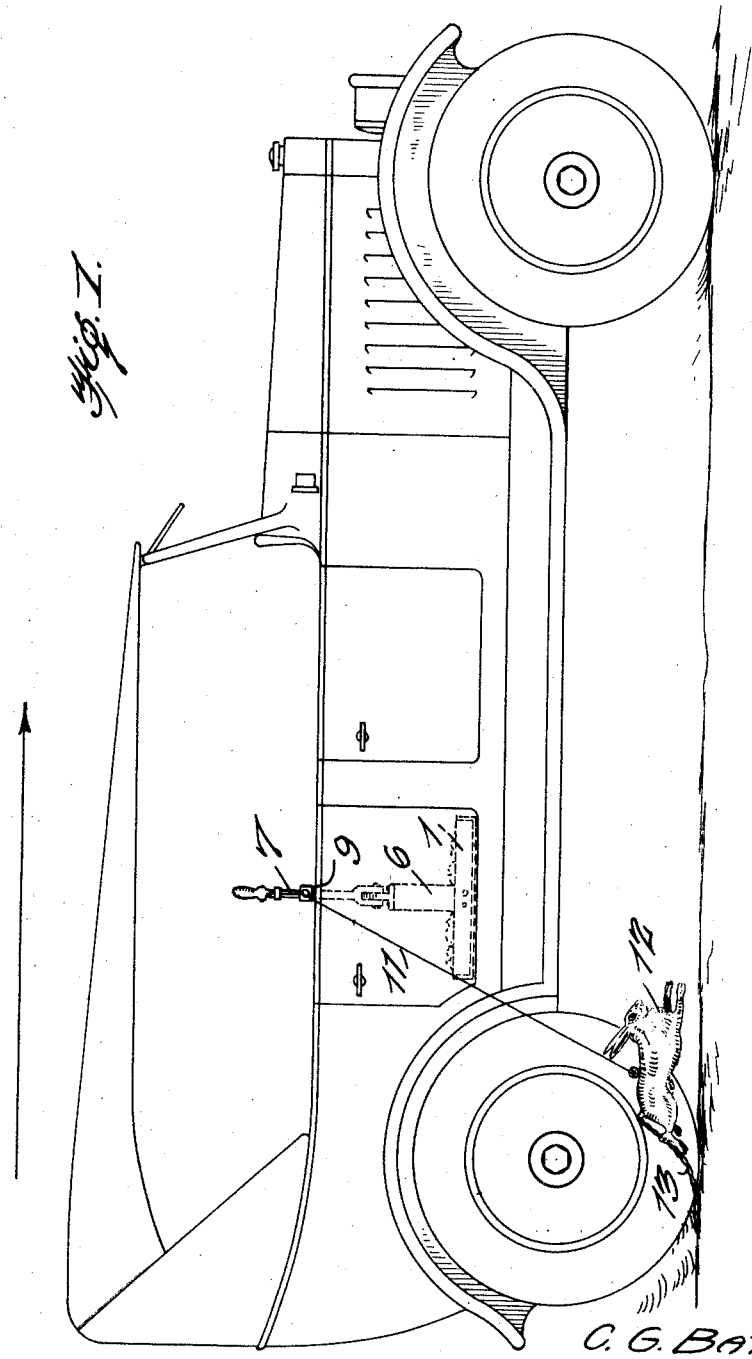

1,672,798

UNITED STATES PATENT OFFICE.

CHARLES G. BATHÉ, OF ST. PETERSBURG, FLORIDA.

DOG-RACING DEVICE.

Application filed June 4, 1926. Serial No. 113,775.

This invention relates to a dog racing device, the general object of the invention being to provide means for supporting an artificial animal or the like from a vehicle, such as an automobile or a motorcycle so as to cause dogs or other animals to race after the artificial animal as the vehicle is speeded along a track or road.

A further object of the invention is to provide means for adjusting the supporting means so that the artificial animal can be suspended just above the ground or road surface to one side of the vehicle, thus giving it the appearance of running along the surface.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view showing the device in use on an automobile.

Figure 2 is a view of the device itself, with parts in section.

Figure 3 is a plan view of the device.

Figure 4 is a view of a section of the base of the supporting device.

In these views, 1 indicates a base which is made in the form of a tray and is composed of two sections 2, one section having an offset inner edge 3 which overlaps the inner edge of the other section and is fastened thereto by screws or the like. Each section has an upright flange 4 at its outer edge, the ends of which are turned in and perforated so that the side strips 5 can be fastened thereto. Thus a tray or box is formed in which sacks of sand or other weights can be placed to hold the device firmly in a vehicle. Figure 1 shows the device placed in the rear part of a touring car, though it will, of course, be understood that it can be placed in other types of vehicles. The size and shape of the box can be changed to suit the vehicle in which it is placed.

An upright 6, preferably formed of strap iron, is fastened to the box with its upper end forming a support for a hand lever 7 and its sector 8. An arm 9 is pivoted to the hand lever and one or more guy wires 10 connect the outer end of the arm with the upper portion of the lever. A cable 11 or other support is fastened to the outer end of the arm 9 and an artificial rabbit 12 or other animal is fastened to the lower end of the cable. A flexible member 13 of considerable weight, such as a chain, is fastened to the rear part of the animal and is designed to drag upon the ground or road surface when the device is in use so as to keep the animal headed in the direction of travel and to stir up dust, thus giving the animal the appearance of running along the road surface alongside the vehicle.

From the foregoing, it will be seen that this device will support the artificial animal from the vehicle and in such a manner that it will have the appearance of running along the road alongside the vehicle. Thus dogs or other animals will chase the device so that dog races can be held without the use of expensive trolley arrangements and the like that are used at the present time.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An animal racing device comprising a support, a horizontally extending boom pivoted to the support so that it can rock about a horizontal axis, a flexible member connected with the outer end of the boom, an artificial animal connected with the lower end of the flexible member and manual means for moving the boom for adjusting the position of the animal relative to the ground.

2. A dog racing device comprising a support adapted to be placed in a vehicle, a boom connected with the support, means for swinging the outer end of the boom in an arc of a circle in a vertical plane, a flexible member connected with the outer end of the boom and an artificial animal connected with the lower end of the flexible member.

3. A dog racing device comprising a support adapted to be placed in a vehicle, a boom connected with the support, means for swinging the outer end of the boom in an arc of a circle in a vertical plane, a flexible member connected with the outer end of the boom and an artificial animal connected with the lower end of the flexible member and a flexible member of considerable weight attached to the rear part of the animal and adapted to drag upon the ground.

4. A dog racing device comprising a support adapted to be placed in a vehicle, a vertically arranged hand lever pivoted at its lower end to the support, a boom pivoted at one end to the hand lever, a guy wire having one end connected with the top part of the lever and its other end to the outer end of the boom, a flexible member connected with the outer end of the boom and an artificial animal connected with the lower end of the flexible member.

In testimony whereof I affix my signature.

CHARLES G. BATHÉ.